United States Patent
Wagner et al.

(10) Patent No.: US 8,713,346 B2
(45) Date of Patent: Apr. 29, 2014

(54) RESUMING PIECEWISE CALIBRATION OF A REAL-TIME-CLOCK UNIT AFTER A MEASURED OFFSET THAT BEGINS AT THE NEXT CALIBRATION PERIOD

(75) Inventors: Jens Wagner, Langen (DE); Armin Dietrich, Aschaffenburg (DE); Jürgen Rohn, Rodgau (DE); Mathias Sedner, Egelsbach (DE); Kai Dieffenbach, Egelsbach (DE)

(73) Assignee: Fujitsu Semiconductor Limited, Yokohama (JP)

( * ) Notice: Subject to any disclaimer, the term of this patent is extended or adjusted under 35 U.S.C. 154(b) by 473 days.

(21) Appl. No.: 13/027,931

(22) Filed: Feb. 15, 2011

(65) Prior Publication Data

US 2011/0204945 A1 Aug. 25, 2011

(30) Foreign Application Priority Data

Feb. 24, 2010 (EP) .................................... 10154544

(51) Int. Cl.
*G06F 1/14* (2006.01)

(52) U.S. Cl.
USPC .......................................................... 713/500

(58) Field of Classification Search
USPC .......................................................... 713/500
See application file for complete search history.

(56) References Cited

U.S. PATENT DOCUMENTS

| | | | | |
|---|---|---|---|---|
| 4,162,443 A | * | 7/1979 | Brearley et al. ............. | 324/76.58 |
| RE35,296 E | * | 7/1996 | Ladas et al. .................... | 377/20 |
| 5,626,625 A | * | 5/1997 | Fernald ........................... | 607/32 |
| 5,826,066 A | * | 10/1998 | Jardine et al. .................. | 713/400 |
| 5,828,248 A | | 10/1998 | Masuda | |
| 6,304,517 B1 | | 10/2001 | Ledfelt et al. | |
| 7,272,078 B1 | * | 9/2007 | Haartsen ........................ | 368/118 |
| 2003/0152177 A1 | | 8/2003 | Cahill-O'Brien et al. | |
| 2006/0122799 A1 | | 6/2006 | Chen et al. | |
| 2008/0082279 A1 | | 4/2008 | Ashburn et al. | |
| 2008/0222440 A1 | | 9/2008 | Jones et al. | |

FOREIGN PATENT DOCUMENTS

| | | |
|---|---|---|
| CN | 1622045 A | 6/2005 |
| CN | 101170349 A | 4/2008 |
| EP | 0 586 256 A2 | 3/1994 |
| EP | 1 304 603 A2 | 4/2003 |
| WO | WO-97/04366 A1 | 2/1997 |
| WO | WO-00/79349 A2 | 12/2000 |
| WO | WO-00/79349 A3 | 12/2000 |
| WO | WO-2005/088424 A2 | 9/2005 |

\* cited by examiner

*Primary Examiner* — Thomas Lee
*Assistant Examiner* — Danny Chan
(74) *Attorney, Agent, or Firm* — Arent Fox LLP

(57) ABSTRACT

A method of calibrating a module whose operation is dependent upon a module clock signal, the method comprising: over each calibration period of a plurality of such periods, obtaining a measure of the frequency of an observed signal, the observed signal being the module clock signal or a clock signal generated based upon the module clock signal; influencing operation of the module in dependence upon the obtained measures so as to calibrate the module; and for each said calibration period, taking account of a position in time of the end of that calibration period relative to a particular feature of the observed signal and delaying the start of the following calibration period relative to a subsequent said particular feature of the observed signal in dependence upon that position.

19 Claims, 6 Drawing Sheets

RESUMING PIECEWISE CALIBRATION OF A REAL-TIME-CLOCK UNIT AFTER A MEASURED OFFSET THAT BEGINS AT THE NEXT CALIBRATION PERIOD

CROSS REFERENCE TO RELATED APPLICATION

This application is based upon and claims the benefit of priority of the prior European Patent Application No. 10154544.0, filed on Feb. 24, 2010, the entire contents of which are incorporated herein by reference.

The present invention relates to methods and circuitry for performing calibration, for example calibration of a module whose operation is dependent upon a module clock signal. Such calibration may be ongoing (e.g. on the fly) calibration, for example while the module is in use. The module may, for example, be a Real-Time Clock (RTC) unit.

An RTC unit may be understood to be a type of "computer" clock, for example implemented in the form of an integrated circuit and commonly for use in a larger circuit or system such as a microcontroller. Such a computer clock is generally employed to keep track of the current time, and may for example keep track of the time and date. RTC units may therefore be employed in almost any electronic device (which may be part of a larger entity such as an automobile or an industrial robot) that needs to keep "accurate" time.

In many electronic devices there is a strong demand for low power consumption. Such demand may be met with a low-power mode of operation, during which mode a fast accurate reference clock signal is switched off. In such a low-power mode, an embedded RTC unit or another such module may be kept running, clocked by a second, slower and usually less accurate clock signal ("module clock signal"). The use of a slower clock signal may lead to lower power consumption as compared to the use of a faster clock signal. Clock sources for such a module clock signal, as well as generally being less accurate than those for the reference clock signal, may be susceptible to significant temperature drift, weathering and aging. These factors may detrimentally influence the accuracy of the RTC unit.

Methods for calibrating RTC units have been previously considered. In general, previously-considered such methods can be divided into two categories, although there may be some overlap between those categories.

In the first category, the RTC unit time value itself may be corrected. Methods of this category generally measure a frequency error in the RTC unit clock signal (module clock signal), for example over fixed intervals or depending on a temperature change.

Such measurements tend to be taken relative to a reference clock signal which is more accurate than the module clock signal.

Based on the measured error, and the time elapsed since the last correction cycle, the amount of time deviation in the RTC unit time value is calculated. This deviation may be positive (indicating that the module clock signal is too slow) or negative (indicating that the module clock signal is too fast). Subsequently, either the time value (hours, minutes, seconds, milliseconds, as appropriate for the application) of the RTC unit itself may be corrected, or the module clock signal of the RTC unit may be temporarily replaced by a faster or slower clock signal to bring the RTC unit time value back towards a correct value.

A disadvantage of methods in the first category may be the discontinuity or sudden rate-change in the RTC unit time value, caused by the corrective action discussed above (e.g. a "jump" in the time value).

Disclosures in this category include US-A1-2008/0082279, CN-A-1622045 and U.S. Pat. No. 6,304,517.

In the second category, the operation of the RTC unit itself (or the module clock signal) may be influenced to perform the correction.

As in the first category, the module clock signal of the RTC unit may be generally measured in some way, for example to find its frequency. As before, a more accurate reference clock signal may be used. The calibration may be triggered at fixed intervals in time, based on measured temperature changes, or only once during manufacture of the device concerned. The measured frequency value may then be processed in hardware or software to determine the calibration necessary for the RTC unit.

Methods in this category may use a number of different delay lines (special integrated circuits) to directly trim the clock oscillator of the RTC unit and so directly correct the RTC clock. These methods offer high accuracies, but place a great demand on the manufacturing quality of the delay lines and their stability over series and temperature.

Temperature-dependent oscillator trimming, with correction values derived from a known temperature profile, may also be carried out. Due to slow temperature changes (in normal cases), and appropriate cyclic calibration intervals, such methods may not show a huge discontinuity in RTC unit time value. Such methods may however suffer from limited achievable accuracy depending on the fixed step width of the calibration values (e.g. oscillator trimming value) which normally cause a minimum remaining error that accumulates over time. In such cases, it is envisaged that additional averaging may need to be implemented, for example in software, to reduce accumulation of errors.

Disclosures in this category include WO-A2-2005/088424, WO-A1-97/04366 and US-A1-2008/0222440.

It is desirable to improve upon existing methods of module (e.g. RTC unit) calibration. For example, it is desirable for RTC units to have a high accuracy over a long operation period whilst employing low accuracy RTC unit clock sources. It is also desirable for RTC units to be automatically calibrated in response to unit clock frequency changes, without requiring any additional sensor hardware. It will be appreciated that an RTC unit is merely one example of a module to which the present invention may be applied.

According to a first aspect of the present invention, there is provided a method of calibrating a module whose operation is dependent upon a module clock signal, the method comprising: over each calibration period of a plurality of such periods, obtaining a measure of the frequency of an observed signal, the observed signal being the module clock signal or a clock signal generated (optionally by the module) based upon the module clock signal; influencing operation of the module in dependence upon the obtained measures so as to calibrate the module; and for each said calibration period, taking account of a position in time of the end of that calibration period relative to a particular feature of the observed signal and delaying the start of the following (subsequent) calibration period relative to a subsequent said particular feature of the observed signal in dependence upon that position.

Such a module may be, for example, a real-time clock unit, which may be part of a larger device such as a microcontroller.

The calibration periods preferably have the same duration as one another, however in some embodiments (which may be configured to carry out complex calculations) different calibration periods may have different durations.

The intervals between calibration periods preferably have substantially the same duration as one another, however in some embodiments (which may be configured to carry out complex calculations) different intervals between calibration periods may have different durations.

The operation of the module is preferably influenced by the measure obtained from one calibration period until the next calibration period, at which point the newly-obtained measure is employed. Optionally, combinations of obtained measures (for example, subjected to a mathematical operation such as averaging) may be employed to influence operation of the module. Optionally, any obtained measure may be employed to influence operation of the module.

The method may comprise positioning said calibration periods in time such that, for each said calibration period, the start of that calibration period is delayed relative to a said particular feature of the observed signal, the delay being equal to a period of time between the end of the preceding calibration period and a said particular feature of the observed signal preceding that end.

The method may comprise positioning said calibration periods in time such that if portions of time were concatenated to exclude the or each full clock cycle of the observed signal between the calibration periods then consecutive said calibration periods would be contiguous in time.

The duration of each calibration period may be determined in relation to a time signal of a higher accuracy than the observed signal. Such a time signal may be, for example, a reference clock signal. The reference clock signal may have a higher (e.g. significantly higher) clock frequency than that of the module clock signal or the observed signal.

The duration of each calibration period may be determined by counting a predetermined number of features of the reference clock signal. For example, rising and/or falling edges of the reference clock signal may be counted.

The method may comprise, between successive such calibration periods, operating the circuitry in a low-power mode in which mode the circuitry does not employ the reference clock signal. For example, the circuitry may be operated in such a low-power mode between successive calibration cycles. The circuitry may be operated in such a low-power mode other than during calibration periods and the delays (delay periods) applied to those periods. The method may comprise deactivating the reference clock signal such that it is not active when the circuitry is in the low-power mode.

The calibration periods (or the calibration cycles having those calibration periods) may be implemented on a regular basis. The regularity may be determined relative to a signal of the module (such as a time signal) benefitting from the above-mentioned calibration.

The method may comprise positioning the calibration periods in time by: measuring a delay period between the end of one such calibration period and a preceding said particular feature of the observed signal; and initiating the next calibration period such that its start is delayed relative to a subsequent said particular feature of the observed signal, the delay being equal to the measured delay period. Each delay period may be measured by counting features of the reference clock signal.

The calibration periods may have the same duration as one another.

The method may comprise, for each calibration period, obtaining said measure of the frequency of the observed signal by counting features of the observed signal.

The influencing may comprise setting a time base employed by the module. The influencing may comprise, following each calibration period, influencing operation of the module in dependence upon the measure obtained in respect of that calibration period. That is, each obtained measure may be employed in such influencing until the next measure is obtained, and so on. Each obtained measure may be employed directly as a time base value to be set in the module.

The features of the various signals counted or monitored may be rising and/or falling edges.

The method may be carried out in hardware, for example employing counters to carry out such counting. The module may be a real-time-clock unit.

There is disclosed herein a method of calibrating a module whose operation is dependent upon a module clock signal, the method comprising: comparing an observed signal to a time signal, the observed signal being the module clock signal or a clock signal generated by the module based upon the module clock signal, and the time signal being more accurate than the observed signal; and adjusting a time base employed by the module in dependence upon a result of such comparison.

There is disclosed herein a method of calibrating a module whose operation is dependent upon a module clock signal, the method comprising: over each calibration period of a plurality of such periods, counting features of an observed signal, the observed signal being the module clock signal or a clock signal generated by the module based upon the module clock signal; and following each such period, configuring operation of the module in dependence upon a result of the counting concerned.

According to a second aspect of the present invention, there is provided a microcontroller configured to carry out a method as described above, for example in accordance with the aforementioned first aspect of the present invention.

According to a third aspect of the present invention, there is provided circuitry configured to carry out a method as described above, for example in accordance with the aforementioned first aspect of the present invention. Such circuitry may comprise said module.

Embodiments of the present invention may be employed, for example in the form of a microcontroller, in mobile communication devices such as mobile terminals, base stations and relays, in automobiles, or in industrial robots.

Reference will now be made, by way of example only, to the accompanying drawings, of which:

Figure 1:
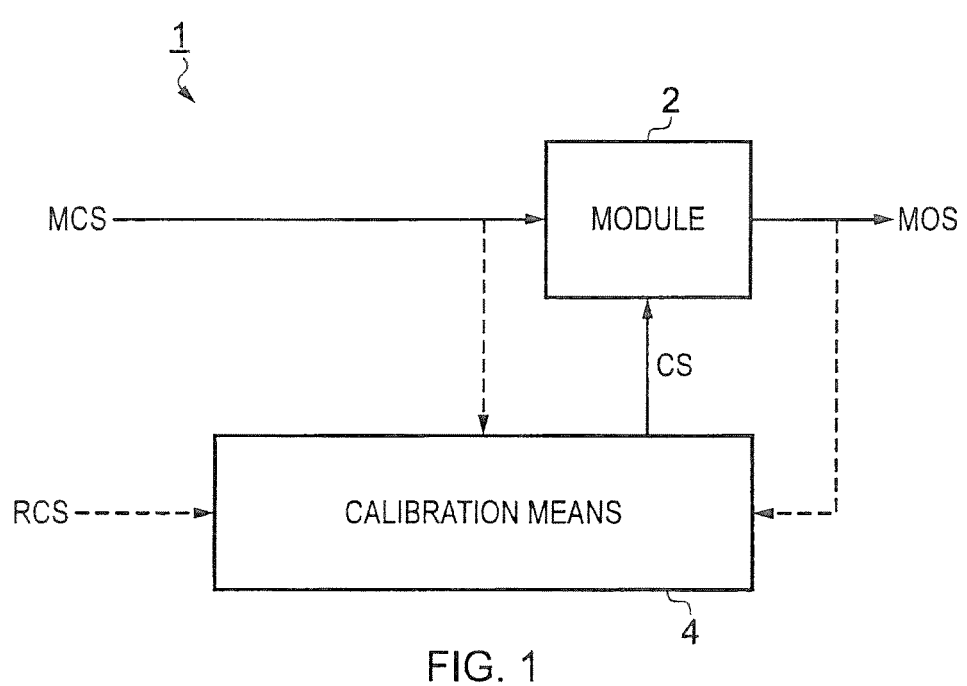
FIG. 1 is a schematic diagram of circuitry embodying the present invention.

FIG. 1 is a schematic diagram of circuitry 1 embodying the present invention. Circuitry 1 comprises a module 2 and calibration means 4.

Module 2 is configured to operate in dependence upon an input module clock signal (MCS). In the example circuitry 1, the module 2 is configured to output a module output signal (MOS) in dependence upon the input MCS. The MOS may thus be considered to be generated from or based upon the MCS, and may for example be a divide-by-two version of the MCS. The module 2 may also output another signal (not shown) which is influenced by the calibration (i.e. calibrated) as discussed below.

Calibration means 4 is configured to obtain, over each calibration period of a plurality of calibration periods, a measure of the frequency of the MCS or a signal generated therefrom such as the MOS. Inputs of the MCS and MOS to the calibration means 4 are represented in FIG. 1 as dashed lines to indicate that only one may be employed in some embodiments. In one embodiment, the measure of the frequency of the MCS may be a result of counting features of the MCS or MOS (an observed signal (OS)).

Calibration means 4 may be configured to control the duration of each calibration period in dependence upon an internally generated accurate time signal, or for example in dependence upon an externally supplied accurate time signal as shown in FIG. 1, such as a reference clock signal (RCS). The input of the RCS in FIG. 1 is again represented by a dashed line to indicate that it may be optional (in the sense that an internally-generated accurate time signal may be employed).

The RCS or other time signal employed by calibration means 4 may be considered to be "accurate" in the sense that it is more accurate than the MCS. In one embodiment, the RCS or other time signal employed by calibration means 4 may be considered to be "accurate" in the sense that it is perfect.

The calibration means 4 may determine when to carry out a calibration period (or a calibration cycle, comprising a calibration period and a delay applied thereto) based on the MCS or the MOS or the RCS, or another signal, or based upon a combination of such signals. The module 2 may also determine when to carry out a calibration period (or a calibration cycle) based on such signals made available to it. Indeed, external hardware of software may be employed to determine when to carry out a calibration period (or a calibration cycle), for example using such signals.

The calibration means 4 may, in one embodiment, count as features of the OS, for example, rising or falling edges or period lengths. It will be appreciated that in general any signal feature may be counted.

Following each calibration period (or calibration cycle), calibration means 4 is operable to output a calibration signal CS to the module 2 to influence or configure operation of the module 2, thereby to calibrate it. Calibration means 4 generates the CS in dependence upon the obtained measure concerned, for example in the preceding calibration period or taking account of more than one preceding calibration period. The obtained measure may be a counting result as mentioned above. As will become apparent, such influencing or configuring serves to compensate for inaccuracy in the observed signal relative to the reference clock signal.

The influencing may involve adjusting or setting a time base employed by the module 2, or for example setting or adjusting a capacitance of a capacitor employed by the module, or controlling delay lines employed by the module. In a preferred embodiment, the influencing involves adjusting or setting a time base.

Calibration means 4 is configured to position the calibration periods in time relative to the OS such that time intervals between consecutive such calibration periods are each substantially an integer number of clock cycles (i.e. one or more whole clock cycles) of the OS long. It will be appreciated that such time intervals need not begin and end with a rising or falling edge of the OS.

Put another way, calibration means 4 is configured to position the calibration periods in time relative to the OS such that consecutive such calibration periods are separated apart in time by at least one or more intermediate full clock cycles of the OS, and such that if portions of time were concatenated to exclude the or each said intermediate full clock cycle (the cycles not necessarily beginning or ending with a rising or falling edge) then consecutive said calibration periods would have the same temporal relationship to one another. Such a temporal relationship may be that consecutive calibration periods, following such concatenation, would be substantially adjacent, contiguous or conterminous.

Calibration means 4 may employ the RCS and the OS (MCS or MOS or another signal based upon the MCS) to position the calibration periods in time. For example, calibration means 4 may employ the OS to arrange for consecutive such calibration periods to be separated apart in time by at least one or more intermediate full clock cycles of the OS. For example, calibration means 4 may count full clock cycles of the OS. Calibration means 4 may employ the RCS and the OS to arrange for such a temporal arrangement to be present, for example using the RCS to measure a period of time between the final feature (e.g. rising edge) of the OS in one calibration period and the end of that calibration period, and then applying that period of time as a delay (using the RCS) relative to a subsequent such feature (e.g. rising edge) of the OS before commencing the next calibration period.

The combination of the applied delay and the following calibration period may be referred to as a calibration cycle.

It will be understood that the calibration cycles may be triggered externally, for example if more than one MCS (not shown) is supplied and it is desired to switch from one MCS to another. For example, calibration cycles may be triggered manually, or by external software or hardware.

Figure 2:
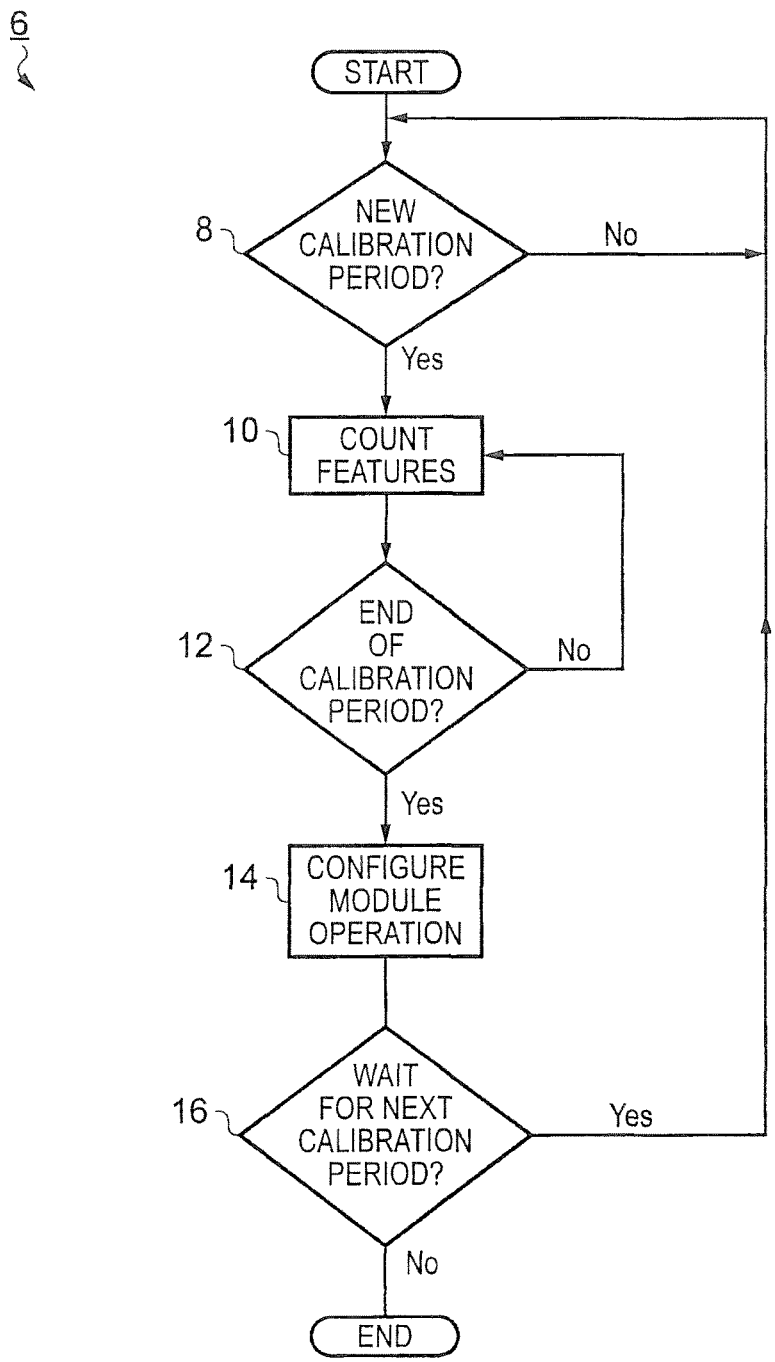
FIG. 2 is a flowchart of a method embodying the present invention.

FIG. 2 is a flowchart setting out a method 6 embodying the present invention. Method 6 comprises steps 8, 10, 12, 14, and 16.

In step 8, it is determined whether a new calibration period is to be started. Method 6 effectively therefore waits (NO, step 8) until it is time to start a new calibration period. If a new calibration period is to be started (YES, step 8), the method proceeds to step 10.

It will be understood that before the new calibration period actually starts, a delay is applied in dependence upon the position of the end of the preceding calibration period. As mentioned above, the applied delay and the following calibration period may be referred to together as a calibration cycle.

In step 10, at which point the calibration period concerned is considered to have actually started, features of the OS are counted, as one example of a technique for obtaining a measure of the frequency of the OS. In step 12, it is determined whether the current calibration period is to be ended. Method 6 effectively therefore waits (NO, step 12) until it is time to end the calibration period, continuing such counting in step 10. If the calibration period is to be ended (YES, step 12) the method proceeds to step 14. The position of the end of that calibration period is recorded in order to determine the delay to be applied to the next calibration period.

In step 14, operation of the module 2 is influenced or configured in dependence upon the obtained measure, in this example being a result of the counting in step 10. The method then proceeds to step 16.

In step 16, it is determined whether a further calibration period (or a further calibration cycle) is to be waited for, i.e. whether there is to be a further calibration period or not. If there is not to be a further calibration period, for example if it is determined that no further calibration is required for some reason, then the method (NO, step 16) ends. Otherwise, the method (YES, step 16) returns to step 8 where the method waits for the right moment to start the next calibration period.

As will become apparent, subsequent embodiments disclosed herein relate to RTC units, however the invention extends to calibration of other units (modules) whose operation is dependent upon a module clock signal, for example any unit required to keep an accurate track of time, or for example any unit required to operate synchronously with one clock signal without employing that clock signal all of the time.

By way of overview, there is described below an embodiment for automatic calibration of an RTC unit. In that embodiment, the reload value of the RTC unit's time base counter (which operates based upon the RTC unit clock signal, or MCS) is cyclically, or from time-to-time, adjusted in order that the time value of the RTC unit follows, as closely as possible, the correct time value. A more accurate reference clock signal (RCS) is used to measure the less accurate RTC unit clock signal (MCS). For a certain period of time (a measurement window, or a "calibration period"), two counters measure full cycles of the MCS (relative to a rising edge of the MCS) and a period-remaining value of the MCS (relative to a rising edge of the MCS at the end of the measurement window), respectively, as will be explained in more detail below.

The full-cycle value (which may amount to a number of counted rising edges) is directly used in the disclosed embodiment as the reload value for the RTC unit's time base counter, although it may be indirectly employed for example in conjunction with another value. For example, it may be used as part of an arithmetical operation (e.g. multiplied by a factor to adapt it to a desired time base). Such a time base counter is generally employed to convert clock cycles into useful time units, e.g. second, minutes and hours. For example, the higher the reload value of the time base counter, the higher the number of clock cycles that need to be counted to measure, for example, a second of time.

The period-remaining value at the end of a measurement window (calibration period) is used to delay the start of the next measurement window (calibration period) relative to, in the following embodiment, a rising edge of the MCS. Thus, as will become apparent, a modulation of the reload value is achieved which causes the reload value to closely follow an optimal value (which value changes with time to compensate for inaccuracies in the module clock signal). The embodiment disclosed below (circuitry, method, etc.) may be employed in electronic devices to achieve high accuracies and automatic recalibration of RTC units in response to inaccuracies in the MCS (e.g. for example due to temperature drift), whilst allowing the RCS to be switched off between calibration cycles (each cycle comprising the delay applied to the start of a calibration period and that calibration period) to enable low-power operation.

The embodiment disclosed below is configured, advantageously, to operate without any additional interaction by a microcontroller (as an example of an electronic device) executing code. That is, it may provide autonomous execution of the calibration without the need for interaction with another entity (e.g. calculations by such a microcontroller). This embodiment is of course applicable to electronic devices generally, microcontrollers being one example type, with an embedded unit (such as an RTC unit) and a dual-clock operation capability.

As mentioned above, RTC units may generate their time base (e.g. the duration of one second) with a reload counter which is clocked by the RTC module clock signal. The reload value determines the length of the time base. By adjusting this reload value, the RTC's time base may be calibrated. Due to adjusting the reload value only in steps of full clock cycles (discarding any fractional value), a system's accuracy may be limited. Depending on the RTC clock frequency and the length of the time base, the remaining errors may quickly accumulate to amount to several minutes of deviation per month. However, embodiments of the present invention (for example the following embodiment) address this potential problem and generate (as will become apparent) a modulation of the reload value. In this way, the resulting reload value on average may tend closely towards an ideal value.

Another challenge for RTC calibration systems is to detect and re-calibrate frequency drift of the RTC clock caused by external influences (e.g. temperature, humidity, . . . ). Embodiments of the present invention, for example the following embodiment, automatically correct for any external influences, such as temperature drifts (which occur relatively slowly). The achievable accuracy of the RTC time base with respect to temperature drift may be substantially only dependent on the quality of the reference clock signal and calibration intervals. There is no need, for example, for an additional temperature sensor.

As will become apparent, the following embodiment is considered to be advantageous due to its achievable high accuracy, automatic calibration to compensate for frequency drift, the lack of need for an additional sensor (such as a temperature sensor) and the low implementation burden (e.g. no additional mathematical processing required).

Figure 3:
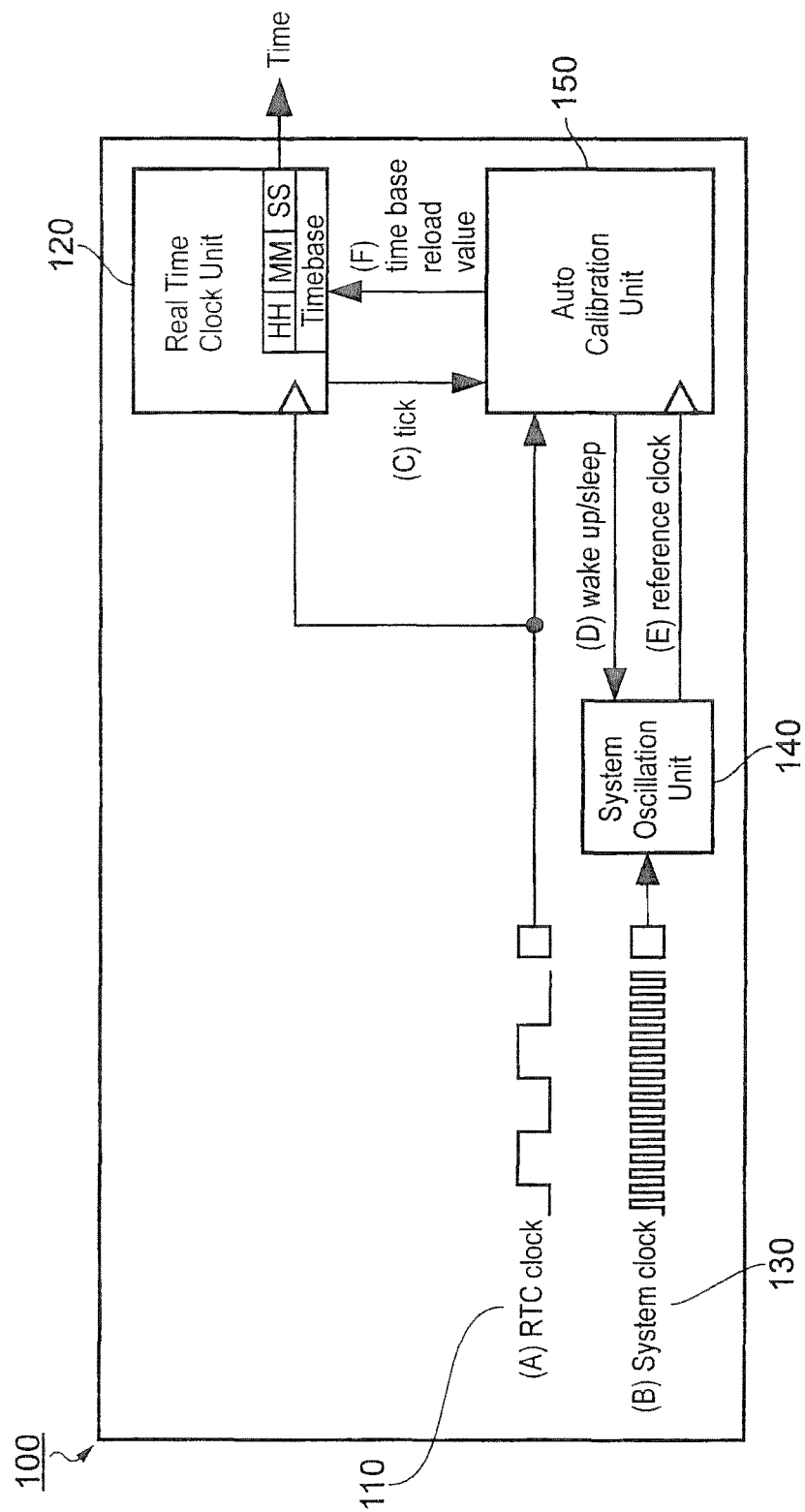
FIG. 3 is a schematic diagram of a system embodying the present invention.

FIG. 3 is a schematic diagram of a system 100 embodying the present invention. System 100 comprises an RTC unit 120, a system oscillation unit (SOU) 140 and an auto-calibration unit (ACU) 150. The system 100 is operable to receive an RTC clock signal (MCS) 110 and a system clock signal (RCS) 130.

As shown in FIG. 3, the ACU 150 is integrated into the system 100. The RTC clock signal 110 (A) is input to the RTC unit 120 as a clock source. The RTC unit 120 is configured to generate/control its time base with a reload timer (not shown) configured to count under the control of the RTC clock signal 110 (A). The reload value of the reload timer therefore sets the duration of the RTC time base. As indicated in FIG. 3, this reload value may be set or controlled by a signal (F) provided by the ACU 150.

The system clock signal 130 (B), which in this embodiment is faster and more accurate than the RTC clock signal 110 (A), is provided to the SOU 140. The SOU 140 is configured to provide a derived reference clock signal (E) to the ACU 150, based upon the system clock signal 130 (B). The reference clock signal (E) may therefore be considered to be the same as or dependent upon the system clock signal 130. The SOU 140 is operable to switch on/off the system clock signal (B) and/or its derived reference clock (E).

The ACU 150 is configured to be clocked by the provided reference clock signal (E). The RTC clock signal (A) is also input to the ACU 150, for use in performing calibration and the generation of wake up/sleep signals (D) as will become apparent.

After a calibration cycle (an applied delay plus a calibration period), a time-base-reload-value signal (F) is input to the RTC unit 120 and a sleep signal (D) is output to the system oscillation unit 140 to switch off the oscillation of the reference clock signal (E). It will be appreciated that the time-base-reload-value signal (F) may cause a current time base reload value to be maintained or changed.

The RTC unit 120 is configured to provide a tick signal (C) to the ACU 150 for use in determining the duration of intervals between successive calibration cycles, i.e. for calibration interval generation. The tick signal (C) may be based upon received rising edges of the RTC clock signal (A) as modulated by the (calibrated) time base of the RTC unit 120, by way of example. If a calibration interval has elapsed, indicating that a new calibration cycle is to commence, the main oscillation unit (SOU 140) is woken up (D) to switch on the oscillation of the system clock signal (B) and the reference clock signal (E), and a new calibration cycle is started. It will be appreciated that the SOU 140, under control of the wake up/sleep signal (D), may be operable to turn on or off the reference clock signal (E) and the system clock signal (B) together, for example to save power when they are both off.

Before the present system 100 is described in further detail, the theory of its operation will first be explained.

The present system 100 is configured to automatically determine a (reload) value for the time base counter of the RTC unit 120, based upon each calibration period. This time base counter is configured to count cycles of the RTC clock signal 110 (A), which signal may be considered to have a frequency $f_{RTC}$. The number of cycles until the counter restarts defines the time base (time_base), i.e. what the module considers to be the duration of its minimum time unit (e.g. a second).

The optimal time base reload value (reload_value$_{opt}$) may be expressed as follows:

$$\text{reload\_value}_{opt} = f_{RTC} \cdot \text{time\_base}$$

The resulting optimal reload value may typically be a floating point number with an integer and fractional value. However, in reality the time base counter is able to count full clock cycles only, i.e. fractional parts of an RTC clock cycle may not be taken into account.

Depending on the quotient of time base divided by RTC clock period, the amount of the fractional value can be in the range of 0 to 1. When neglecting this fractional value, as a time base counter may do, each timer tick of the RTC unit would involve a small error, such errors accumulating over time to cause an increasing deviation of the time signal. For example, it may appear that the RTC unit is running too fast.

Figure 4:
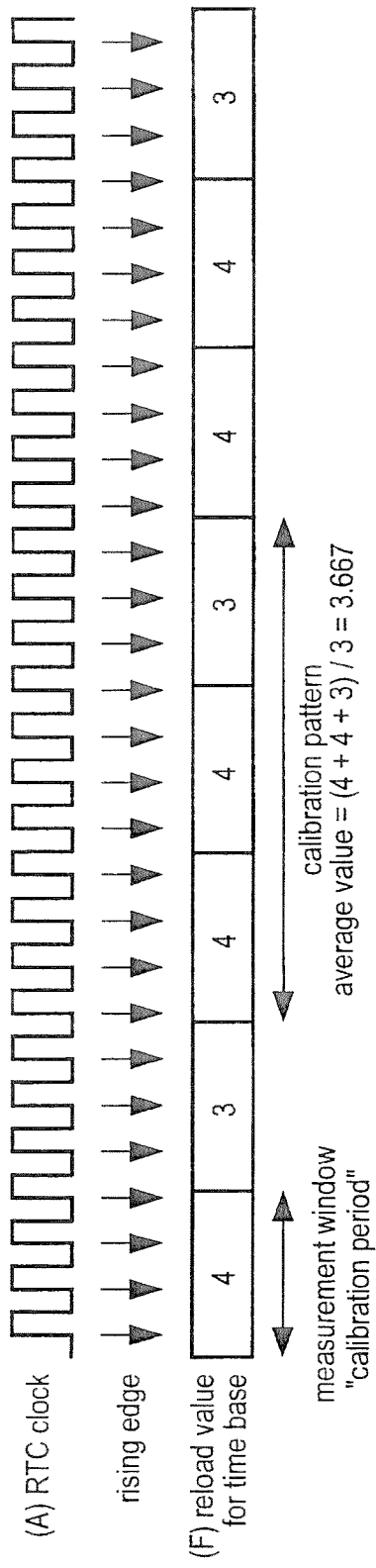
FIG. 4 is a timing diagram useful for understanding a principle employed by the FIG. 3 embodiment.

In the present embodiment, such deviation may be prevented or compensated for by modulating the reload value of the time base counter. Such modulation is automatically provided in the present embodiment by way of the ACU 150, which is configured to operate in accordance with the following principle. Reference is made to FIG. 4, which is a timing diagram useful for understanding this principle.

The timing diagram in FIG. 4 shows consecutive calibration cycles with their respective calibration periods (measurement windows) shown as a series of rectangles of equal width, indicating that the calibration periods have the same duration as one another. The RTC clock signal (A) is also shown alongside the calibration periods, with rising edges of that signal being represented by downwardly-pointing arrows.

In the case of FIG. 4 (in contrast to FIG. 5 to be described below), there are no gaps or breaks (i.e. there is no idle time) between consecutive calibration periods.

Within a calibration period, full RTC clock cycles relative to rising edges are counted, i.e. rising edge events. As indicated in FIG. 4 by way of illustration, four edges have been counted in the first calibration period, three in the second, four in the third, and so on.

The calibration periods are generated based upon the reference clock signal (E), and are therefore more accurate than, but asynchronous to, the RTC clock signal (A). If, in theory, one calibration period follows its predecessor without a gap as shown in FIG. 4, successive starting points of the calibration periods shift in relation to the RTC clock signal (A). Depending on the changing relative position of the starting points of the calibration periods relative to the RTC clock signal (A), one edge event more or less is counted from time to time. This variation of the counted values directly represents the necessary modulation of the reload value (controlled by the time-base-reload-value signal (F)) for the RTC time base counter. It will be appreciated that the time-base-reload-value signal (F) may carry the counting results themselves, or for example an up/down increment signal.

For a stable RTC clock signal (A), the sequence of count results (which may be used directly as reload values) follows a periodic behaviour, which may be referred to as a repeating calibration pattern. In FIG. 4, the calibration pattern is a repeating pattern of 4, 4, 3. The average of the values within one period (3.667 in the FIG. 4 example) comes very close to the optimal time base value (reload_value$_{opt}$). The achievable accuracy is thus now only limited to the accuracy and resolution of the reference clock signal (E).

Figure 5:
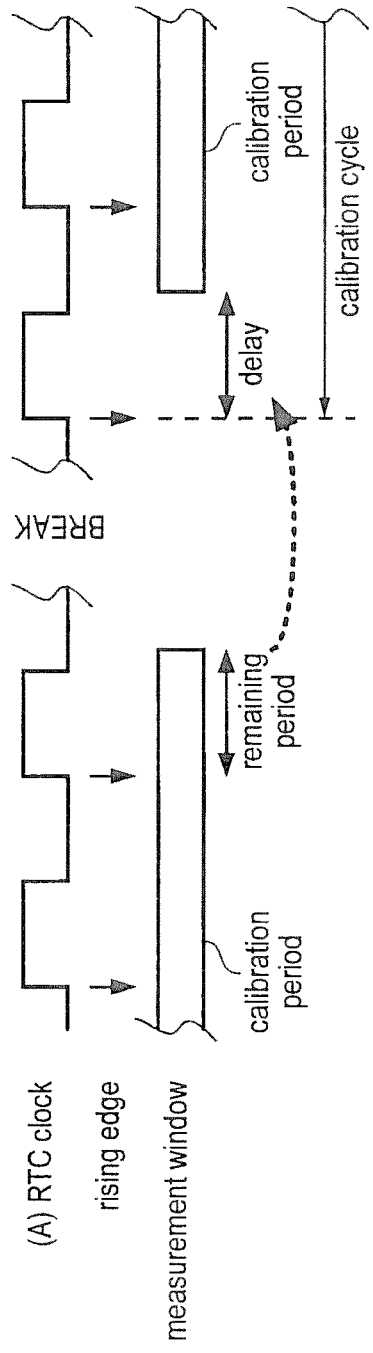
FIG. 5 is a timing diagram akin to that of FIG. 4, but showing breaks or gaps between successive calibration periods, the gaps representing periods of low-power operation.

To be able to switch off the system clock signal (B) from time to time to save power, it is desirable to have gaps between consecutive calibration cycles. Reference in this regard is made to FIG. 5, which is a timing diagram akin to that of FIG. 4, but showing breaks or gaps (which could be for many cycles of the RTC clock signal) between successive calibration cycles. By way of example, in one embodiment the calibration periods (of the calibration cycles) may have a duration of 250 ms, and the intervals between successive calibration cycles may have a duration of one minute, or even ten minutes.

For keeping the FIG. 4 behaviour of shifting the start of successive new calibration periods, in the present embodiment the ACU 150 measures the time remaining (remaining period) between the last rising edge of the RTC clock signal (A) in a calibration period and the end of that calibration period. This "remaining period" represents the desired delay to be applied in the next calibration cycle, i.e. for delaying the start of the next calibration period relative to a subsequent rising edge of the RTC clock signal (see FIG. 5). By employing this procedure, time gaps (calibration intervals) can be inserted between calibration cycles over which the system clock signal (B) and/or the reference clock signal (E) is switched off, while keeping substantially the same behaviour as depicted in FIG. 4.

Figure 6:
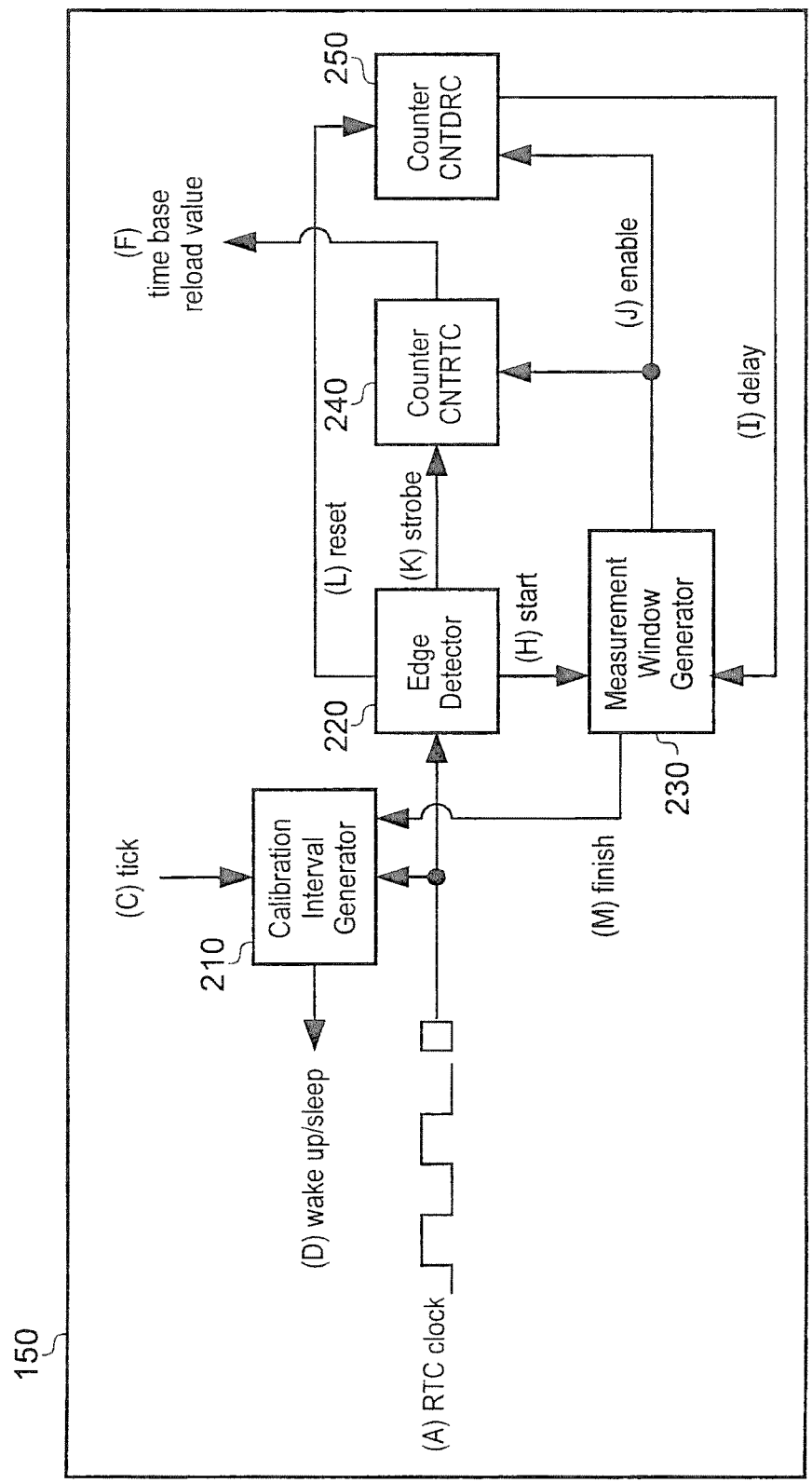
FIG. 6 is a schematic diagram of an example implementation of the auto-calibration unit of FIG. 3.

FIG. 6 is a schematic diagram presenting an example implementation of the ACU 150. ACU 150 comprises a calibration interval generator 210, an edge detector 220, a measurement window generator 230, a CNTRTC counter 240 and a CNTDRC counter 250.

The ACU 150 is configured to operate in dependence upon the reference clock signal (E), the RTC clock signal (A), and the tick signal (C), however for simplicity the input of the reference clock signal (E) to the various elements is not shown in FIG. 6.

The start of a calibration cycle is initiated by the calibration interval generator 210, which is configured to count RTC timer ticks based upon the tick signal (C) provided from the RTC unit 120. If this counter has elapsed, the wake up signal (D) is output to the SOU 140 to switch on the system clock signal (B) and so the reference clock signal (E). A new calibration cycle is thus to be started.

The start of a calibration cycle is synchronized with the RTC clock signal (A). For this purpose, the edge detector 220 provides a start signal (H) on the next rising edge of the RTC clock. This start signal (H) activates the measurement window generator 230. The measurement window generator 230 starts counting down the delay counter value (I), which is provided from the CNTDRC counter 250 based upon the previous calibration cycle. With the delay value reaching 0, the RTC clock cycle counter (CNTRTC counter 240) is set to 0 (based on a reset signal not shown in FIG. 6) and the calibration period of the current calibration cycle is started.

As long as the calibration period (measurement window) is active, the enable signal (J) is active. As long as the enable signal (J) is active, the RTC clock cycle counter (CNTRTC counter 240) counts up with each new edge strobe signal (K) provided by the edge detector 220. In parallel, as long as the enable signal (J) is active, the period rest CNTDRC counter 250 counts up with each reference clock signal (F) cycle. On each rising edge of the RTC clock signal (A), the edge detector 220 outputs a reset signal (L) to clear the "remaining period" counter CNTDRC 250.

On expiration of the calibration period time, measured by the measurement window generator 230 in reference to the reference clock signal (E), the enable signal (J) is disabled, which causes counters CNTRTC 240 and CNTDRC 250 to stop operating and hold their values. The reset signal (L) will not clear the "remaining period" counter CNTDRC 250 at this time.

The counter value of CNTRTC 240, which has essentially counted edges such as rising edges of the RTC clock signal during the calibration period (measurement window) of that calibration cycle, is directly used as the time base reload value, and in this embodiment directly as the time-base-reload-value signal (F), for the RTC unit 120. The period rest counter CNTDRC 250 holds its value, which is used as the delay value (I) for the next calibration cycle.

The measurement window generator 230 then outputs a finish signal (M) to the calibration interval generator 210, which causes output of the sleep signal (D) to the SOU 140. Accordingly, the system clock signal (B) and the reference clock signal (E) are switched off. The calibration interval generator 210 is re-started to count timer ticks (C) of the RTC unit until the interval elapses and a new calibration cycle is started.

Figure 7:
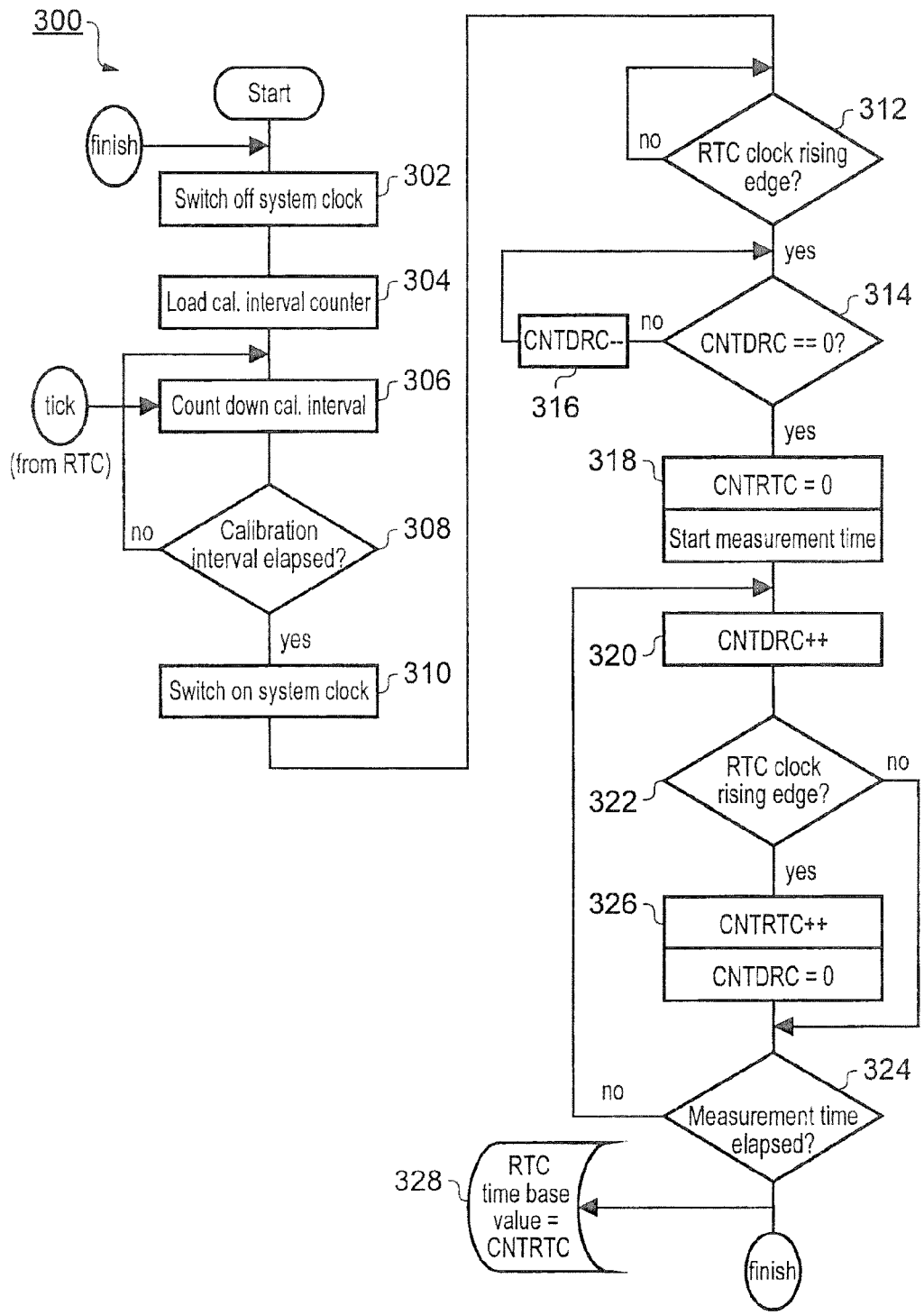
FIG. 7 is a flowchart of a method embodying the present invention.

FIG. 7 is a flowchart of a method 300 embodying the present invention. Method 300 comprises steps 302 to 328.

The method 300 starts, following the end of a preceding calibration cycle, at step 302. In step 302 the system clock signal (B) and the reference clock signal (E) are switched off, to save power between calibration cycles. Then, in step 304, the counter of the calibration interval generator 210 is loaded so that the interval between calibration cycles may be determined.

In step 306, the value loaded into the counter of the calibration interval generator 210 is decremented when a tick signal (C) is received form the RTC unit 120, at which point the method proceeds to step 308. In step 308, it is determined whether the calibration interval has elapsed, i.e. whether the value loaded into the counter of the calibration interval generator 210 has been decremented to zero.

Method 300 effectively waits (NO, step 308) until the value loaded into the counter of the calibration interval generator 210 has been decremented to zero by returning to step 306 and decrementing the loaded value at the next tick signal (C). When the value has been decremented to zero (YES, step 308), the method proceeds to step 310 as a new calibration cycle is to be started.

In step 310, the system clock signal (B) and the reference clock signal (E) are switched on. The method then proceeds to step 312 in which a rising edge (as an example clock-signal feature) of the RTC clock signal (A) is awaited (NO, step 312). When such a rising edge is detected (YES, step 312), the method proceeds to step 314.

In step 314, it is judged whether the counter value CNTDRC is equal to 0, and if it is not (NO, step 314) the value is decremented per cycle of the reference clock signal (E) through successive instances of step 316 until it does (YES, step 314). In this way, the start of the calibration period (measurement window) of that calibration cycle is delayed relative to a rising edge of the RTC clock signal (A) in accordance with the counter value CNTDRC held from the preceding calibration cycle.

Once the counter value CNTDRC has reached 0 (YES, step 314), the method proceeds to step 318 which symbolises the beginning of the calibration period of that calibration cycle. In step 318, the counter value CNTRTC is set to 0.

The method then proceeds in a loop through steps 320, 322 and 324 until the next rising edge of the RTC clock signal (A) is detected, assuming that the calibration period (measurement window or measurement time) has not expired (NO, steps 322 and 324). In each such loop, one per cycle of the reference clock signal (E), the counter value CNTDRC is incremented in step 320.

When a rising edge of the RTC clock signal (A) is detected (YES, step 322), the method passes between steps 322 and 324 via step 326, in which step the counter value CNTRTC is incremented, effectively to count such rising edges, and in which the counter value CNTDRC is reset to 0, effectively to zero the recorded delay (remaining period) value.

Accordingly, when the measurement time (calibration period) is found to have elapsed (YES, step 324), the counter value CNTRTC represents the number of rising edges of the RTC clock signal (A) detected during that calibration period, and the counter value CNTDRC represents the "remaining period" time in clock cycles of the reference clock signal (E), being the time between the last rising edge of the RTC clock signal (A) and the end of the calibration period.

The counter value CNTRTC is then used in step 328 to set the time base used by the RTC unit 120. The method then returns to step 302 where the system clock signal (B) and/or the reference clock signal (E) is switched off to take the system into a low-power mode of operation. The counter value CNTDRC is retained to be used as the delay by which the next calibration period is to be delayed relative to a rising edge of the RTC clock signal (A) (in steps 314 and 316).

Statement 1: There is disclosed herein a system for real time clock automatic calibration for an electronic device comprising of: an RTC unit or any similar unit for counting time and date (according to 120), operating on a RTC clock (according to (A)); and an auto calibration unit (according to 150) operating on a second clock (reference clock, according to (E)) for calibrating the RTC clock.

Statement 2: There is disclosed herein an automatic calibration unit working in such a system (see Statement 1) comprising of the following inputs and outputs: a signal input for RTC clock (according to (A)); a clock input for reference clock (according to (E)); a signal input for a time tick signal from the RTC unit (according to (C)); a value output that provides the reload value for the time base of the RTC unit (time base reload value, according to (F)); and a signal output for wake up and sleep (according to (D)) controlling a system oscillation unit to switch on/off the system clock to offer power saving modes.

Statement 3: Such an auto calibration unit (see Statement 2) may comprise: a unit for calibration interval and control signal generation (according to 210); a unit for RTC clock edge detection and generating control signals (according to 220); a unit for generating a measurement window and control signals (according to 230); a unit for counting RTC clock cycles (CNTRTC, according to 240); and a unit for counting reference clock cycles (CNTDRC, according to 250).

Statement 4: There is disclosed herein a method of generating time intervals to cyclically start RTC auto calibration executed by such a system (see Statement 3) comprising: counting RTC time tick events to generate a calibration interval; generating a wake up signal when the calibration interval is elapsed; and restarting a calibration interval on input of a finish signal (according to (M)) and outputting a sleep signal.

Statement 5: There is disclosed herein a method of RTC auto calibration working on such a system (see Statement 3) comprising: detecting rising edges of the RTC clock; starting to count a delay time which is given by the previous counter value of CNTDRC; upon expiration of the delay time: resetting the counter value of CNTRTC; and starting counting a measurement window time; while the measurement window time is running: counting RTC clock cycles with counter CNTRTC; counting system clock cycles with counter CNTDRC; and resetting the CNTDRC value to 0 upon each rising edge of the RTC clock; and upon expiration of the measurement window time: stopping and holding the counters CNTRTC and CNTDRC; outputting the counter value of CNTRTC; outputting a finish signal; and using the counter value of CNTRTC as RTC time base reload value.

Statement 6: There is disclosed herein a method of performing a RTC auto calibration routine working on such a system (see Statement 3) comprising: starting such an RTC auto calibration run (see Statement 5) upon expiration of a such calibration interval (see Statement 4); and starting such a calibration interval run (see Statement 4) upon output of such a finish signal (see Statement 5).

Statement 7: There is disclosed herein a method of performing a RTC auto routine cycle working on such a system (see Statement 3) comprising: cyclically repeating a method as in Statement 6 above; and using equidistant calibration intervals and so achieving an averaging behaviour of the RTC time base value over time.

The systems/methods may be implemented in hardware or software. It is desirable to implement the systems and methods in hardware.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it could, for example, be in the form of a signal such as a downloadable data signal provided from an Internet website, or it could be in any other form.

The invention claimed is:

1. A method of calibrating a module whose operation is based on a module clock signal, the method comprising:
   over each calibration period of a plurality of the calibration periods, obtaining a frequency of an observed signal by counting features of the observed signal, the observed signal being the module clock signal or a clock signal generated based upon the module clock signal;
   configuring an operation of the module based upon the obtained frequency to calibrate the module; and
   for each calibration period, taking account of a first position in time of an end of each calibration period relative to a first particular feature of the observed signal and delaying a start of a calibration period following each calibration period relative to a second particular feature of the observed signal subsequent to the first particular feature of the observed signal based on the first position.

2. The method as claimed in claim 1, further comprising positioning the calibration periods in time so that, for the each calibration period, a start of each calibration period is delayed relative to a third particular feature of the observed signal, the delay being equal to a period of time between an end of a preceding calibration period preceding each calibration period and a fourth particular feature of the observed signal preceding the end of the preceding calibration period, the third particular feature of the observed signal being subsequent to the fourth particular feature of the observed signal.

3. The method as claimed in claim 1, further comprising positioning the calibration periods in time so that each of a plurality of time intervals between consecutive calibration periods of the plurality of the calibration periods is an integer of clock cycles of the observed signal in length.

4. The method as claimed in claim 1, wherein a duration of each calibration period is determined in relation to a time signal of a higher accuracy than the observed signal.

5. The method as claimed in claim 4, wherein the time signal is a reference clock signal.

6. The method as claimed in claim 5, wherein the reference clock signal has a higher clock frequency than that of the module clock signal or the observed signal.

7. The method as claimed in claim 5, wherein the duration of each calibration period is determined by counting a first number of features of the reference clock signal.

8. The method as claimed in claim 5, further comprising, between successive calibration periods of the plurality of the calibration periods, operating a circuitry in a low-power mode in which mode the circuitry does not employ the reference clock signal.

9. The method as claimed in claim 1, further comprising implementing the calibration periods on a regular basis.

10. The method as claimed in claim 1, further comprising positioning the calibration periods in time by:
    measuring a delay period between an end of one calibration period of the plurality of the calibration periods and the first particular feature of the observed signal preceding the end of the one calibration period; and
    initiating a next calibration period next to the one calibration period so that a start of the next calibration period is delayed relative to the second particular feature of the observed signal subsequent to the first particular feature of the observed signal, the delay being equal to the measured delay period.

11. The method as claimed in claim 10, wherein a duration of each calibration period is determined in relation to a time signal of a higher accuracy than the observed signal and the time signal is a reference clock signal, and the method further comprises measuring each delay period by counting features of the reference clock signal.

12. The method as claimed in claim 1, wherein the configuring comprises setting a time base employed by the module.

13. The method as claimed in claim 1, wherein the module is a real-time-clock unit.

14. The method as claimed in claim 2, further comprising positioning the calibration periods in time so that each of a plurality of time intervals between consecutive calibration periods of the plurality of the calibration periods is an integer of clock cycles of the observed signal in length.

15. The method as claimed in claim 6, wherein the duration of each calibration period is determined by counting a first number of features of the reference clock signal.

16. The method as claimed in claim 6, further comprising, between successive calibration periods of the plurality of the calibration periods, operating a circuitry in a low-power mode in which mode the circuitry does not employ the reference clock signal.

17. The method as claimed in claim 7, further comprising, between successive calibration periods of the plurality of the calibration periods, operating a circuitry in a low-power mode in which mode the circuitry does not employ the reference clock signal.

18. Circuitry which calibrates a module whose operation is based on a module clock signal, comprising a microcontroller configured to perform:
- over each calibration period of a plurality of the calibration periods, obtaining a frequency of an observed signal by counting features of the observed signal, the observed signal being the module clock signal or a clock signal generated based upon the module clock signal;
- configuring an operation of the module based on the obtained frequency to calibrate the module; and
- for each calibration period, taking account of a first position in time of an end of each calibration period relative to a first particular feature of the observed signal and delaying a start of a calibration period following each calibration period relative to a second particular feature of the observed signal subsequent to the first particular feature of the observed signal based on the first position.

19. A mobile communication device, or an automobile, or an industrial robot, comprising circuitry which calibrates a module whose operation is based upon a module clock signal including a microcontroller configured to perform:
- over each calibration period of a plurality of the calibration periods, obtaining a frequency of an observed signal by counting features of the observed signal, the observed signal being the module clock signal or a clock signal generated based upon the module clock signal;
- configuring an operation of the module based upon the obtained frequency to calibrate the module; and
- for the each calibration period, taking account of a first position in time of an end of each calibration period relative to a first particular feature of the observed signal and delaying a start of a calibration period following each calibration period relative to a second particular feature of the observed signal subsequent to the first particular feature of the observed signal based upon the first position.

\* \* \* \* \*